(12) United States Patent
Kinjo et al.

(10) Patent No.: US 12,124,145 B2
(45) Date of Patent: Oct. 22, 2024

(54) METHOD OF MANUFACTURING LIQUID CRYSTAL ELEMENT AND LIQUID CRYSTAL ELEMENT

(71) Applicant: Japan Display Inc., Tokyo (JP)

(72) Inventors: Hiroumi Kinjo, Tokyo (JP); Koichi Igeta, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/362,091

(22) Filed: Jul. 31, 2023

(65) Prior Publication Data

US 2024/0036430 A1 Feb. 1, 2024

(30) Foreign Application Priority Data

Aug. 1, 2022 (JP) .................................. 2022-122871

(51) Int. Cl.
*G02F 1/137* (2006.01)
*G02F 1/1333* (2006.01)
*G02F 1/1335* (2006.01)
*G02F 1/1337* (2006.01)

(52) U.S. Cl.
CPC .... *G02F 1/13718* (2013.01); *G02F 1/133365* (2013.01); *G02F 1/133536* (2013.01); *G02F 1/133757* (2021.01); *G02F 1/133761* (2021.01); *G02F 1/133788* (2013.01)

(58) Field of Classification Search
None
See application file for complete search history.

(56) References Cited

U.S. PATENT DOCUMENTS

| | | | | |
|---|---|---|---|---|
| 2002/0036735 A1* | 3/2002 | Arakawa | ............... | G02B 5/3016 349/115 |
| 2004/0165140 A1* | 8/2004 | Pokorny | ............. | G02B 5/3016 349/187 |
| 2010/0177266 A1* | 7/2010 | Kuo | ........................ | B32B 37/12 349/187 |

FOREIGN PATENT DOCUMENTS

JP 2020131638 A 8/2020

* cited by examiner

*Primary Examiner* — Phu Vu
(74) *Attorney, Agent, or Firm* — Maier & Maier, PLLC (57) ABSTRACT

According to one embodiment, a method of manufacturing a liquid crystal element, includes forming an alignment layer on a support, forming a cholesteric liquid crystal layer containing a plasticizer and having elasticity on the alignment layer, adhering a flexible substrate to the cholesteric liquid crystal layer via a first adhesive layer, peeling the cholesteric liquid crystal layer adhered to the flexible substrate, off from the support and the alignment layer, adhering the cholesteric liquid crystal layer to a rigid substrate via a second adhesive layer and removing the flexible substrate and the first adhesive layer.

4 Claims, 7 Drawing Sheets

METHOD OF MANUFACTURING LIQUID CRYSTAL ELEMENT AND LIQUID CRYSTAL ELEMENT

CROSS-REFERENCE TO RELATED APPLICATIONS

This application is based upon and claims the benefit of priority from Japanese Patent Application No. 2022-122871, filed Aug. 1, 2022, the entire contents of which are incorporated herein by reference.

FIELD

Embodiments described herein relate generally to a method of manufacturing a liquid crystal element and a liquid crystal element.

BACKGROUND

In recent years, various types of liquid crystal elements that use cholesteric liquid crystals have been studied. Cholesteric liquid crystals have the property of reflecting light of a specific wavelength according to the helical pitch. For example, a composite structure comprising a cholesteric liquid crystal elastomer between a pair of substrates has been proposed.

DETAILED DESCRIPTION

In general, according to one embodiment, there is provided a method of manufacturing a liquid crystal element, comprising forming an alignment layer on a support, forming a cholesteric liquid crystal layer containing a plasticizer and having elasticity on the alignment layer, adhering a flexible substrate to the cholesteric liquid crystal layer via a first adhesive layer, peeling the cholesteric liquid crystal layer adhered to the flexible substrate, off from the support and the alignment layer, adhering the cholesteric liquid crystal layer to a rigid substrate via a second adhesive layer and removing the flexible substrate and the first adhesive layer.

According to another embodiment, a liquid crystal element comprises a rigid substrate, a first cholesteric liquid crystal layer containing a plasticizer and having elasticity and a first adhesive layer that adheres the substrate and the first cholesteric liquid crystal layer to each other.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and an overlapping detailed description thereof is omitted unless otherwise necessary.

Note that, in order to make the descriptions more easily understandable, some of the drawings illustrate an X axis, a Y axis and a Z axis orthogonal to each other. A direction along the X axis is referred to as an X direction or a first direction, a direction along the Y axis is referred to as a Y direction or a second direction and direction along the Z axis is referred to as a Z direction or a third direction. A plane defined by the X axis and the Y axis is referred to as an X-Y plane, and viewing towards the X-Y plane is referred to as plan view. The first direction X and the second direction Y correspond, for example, to directions parallel to the main surface of the substrate included in a liquid crystal element 100, and the third direction Z corresponds to the thickness direction of the liquid crystal element 100.

First Embodiment

Figure 1:
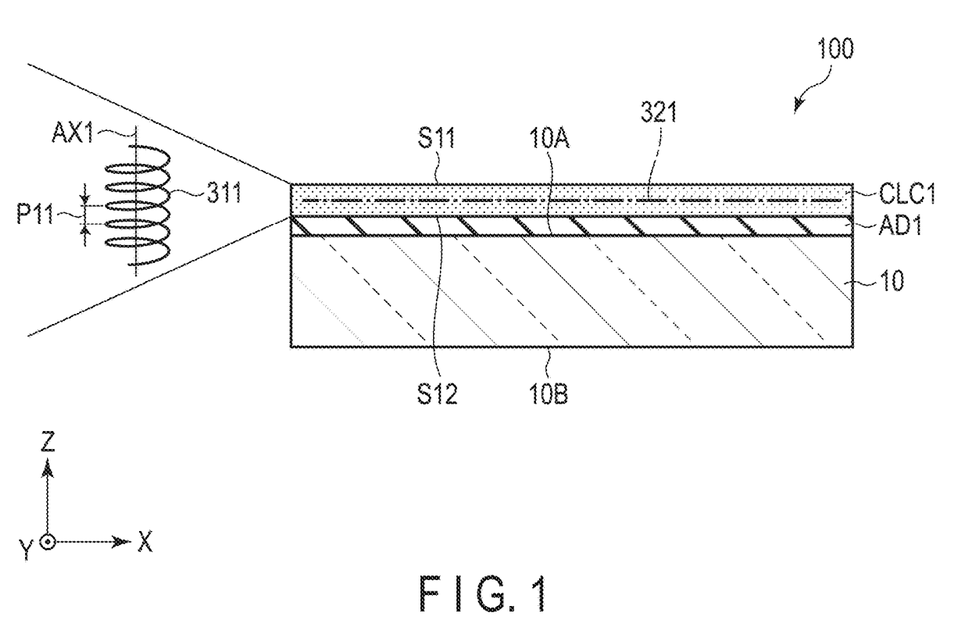
FIG. 1 is a cross-sectional view showing an example of a liquid crystal element according to an embodiment.

FIG. 1 is a cross-sectional view showing an example of the liquid crystal element 100 according to the embodiment.

The liquid crystal element 100 has a rigid substrate 10, a cholesteric liquid crystal layer (first cholesteric liquid crystal layer) CLC1, and an adhesive layer AD1 that bonds the substrate 10 and the cholesteric liquid crystal layer CLC1 to each other.

The rigid substrate 10 is formed of any one of glass, plastic and acrylic, for example. The substrate 10 is, for example, transparent. The substrate 10 includes a main surface (inner surface) 10A and a main surface (outer surface) 10B on an opposite side to the main surface 10A. The main surface 10A and the main surface 10B are parallel to the X-Y plane.

The adhesive layer AD1 is located on the substrate 10 and is in contact with the main surface 10A. Further, the adhesive layer AD1 is, for example, transparent. The adhesive layer AD1 is located between the substrate 10 and the cholesteric liquid crystal layer CLC1 in the third direction Z. Examples of applicable materials for forming the adhesive layer AD1 are adhesives such as acrylic resins, urethane resins, ethiol resins, epoxy resins, silicone resins, polyvinyl alcohol resins, polyvinyl acetal resins, polyvinyl butyral resins and the like, and optically adhesive sheets.

The cholesteric liquid crystal layer CLC1 is adhered to the adhesive layer AD1. The cholesteric liquid crystal layer CLC1 has elasticity because it contains a plasticizer. The cholesteric liquid crystal layer CLC1 is formed, for example, by using a mixture of a polymerizable liquid crystal monomer, a polymerizable chiral liquid crystal monomer and a photoinitiator with a plasticizer and a cross-linking agent further added therein.

Applicable examples of the photoinitiator are alkylphenone photo-polymerization initiator (Omnirad 651), acylphosphine oxide photo-polymerization initiator (Omnirad TPO H), intramolecular hydrogen-drawn photo-polymerization initiator (Omnirad MBF), intramolecular hydrogen-drawn photo-polymerization initiator (Irgacure OXE01) and cationic photo-polymerization initiator (Omnirad 250).

As the plasticizer, a non-polymerizable liquid crystal monomer such as 4-cyano-4'-pentylbiphenyl (5CB) is applicable. The cholesteric liquid crystal layer CLC1 contains, for example, a single-component nematic liquid crystal or a nematic liquid crystal formed from multiple components as a plasticizer.

Applicable example of the cross-linking agent are 1,6-hexanediol diacrylate, 1,4-butanediol diacrylate and trimethylolpropane triacrylate.

The cholesteric liquid crystal layer CLC1 includes a main surface (inner surface) S11 and a main surface (outer surface) S12 on an opposite side to the main surface S11. The main surface S12 is in contact with the adhesive layer AD1. The main surfaces S11 and S12 are substantially parallel to the X-Y plane.

As shown schematically in the enlarged view, the cholesteric liquid crystal layer CLC1 contains cholesteric liquid crystals 311 rotating in a first rotating direction. The cholesteric liquid crystals 311 each include a helical axis AX1 substantially parallel to the third direction Z and have also a helical pitch P11 along the third direction Z. The helical pitch P11 indicates one period of the helix (the layer thickness along the helical axis AX1 required for the liquid crystal molecules to rotate 360 degrees).

The cholesteric liquid crystal layer CLC1 includes a reflective surface 321. On the reflective surface 321, of the incident light on the cholesteric liquid crystal layer CLC1, circularly polarized light of a selected reflection wavelength band determined according to the helical pitch and refractive index anisotropy is reflected. For example, when the first rotating direction is rightward, circularly polarized light rotating rightward is reflected at the reflective surface 321, and when the first rotating direction is leftward, circular polarized light rotating leftward is reflected at the reflective surface 321. In this specification, the term "reflection" in the cholesteric liquid crystal layer CLC1 is accompanied by diffraction within the cholesteric liquid crystal layer CLC1. Further, in this specification, circular polarization may be strictly circular polarization or circular polarization which can be approximated to elliptical polarization.

In the liquid crystal element 100 of such an example, the reflective surface 321 of the cholesteric liquid crystal layer CLC1 reflects first circularly polarized light in the selected reflection wavelength band, which corresponds to the first rotating direction of the cholesteric liquid crystal 311.

Note that the main surface 10B is in contact with a low refractive index medium having a refractive index lower than that of the substrate 10. Similarly, the main surface S11 is in contact with a low refractive index medium having a refractive index lower than that of the cholesteric liquid crystal layer CLC1. The low refractive index medium is, for example, air. The main surface 10B and the main surface S11 can form respective light-entering surfaces of the liquid crystal element 100.

Figure 2:
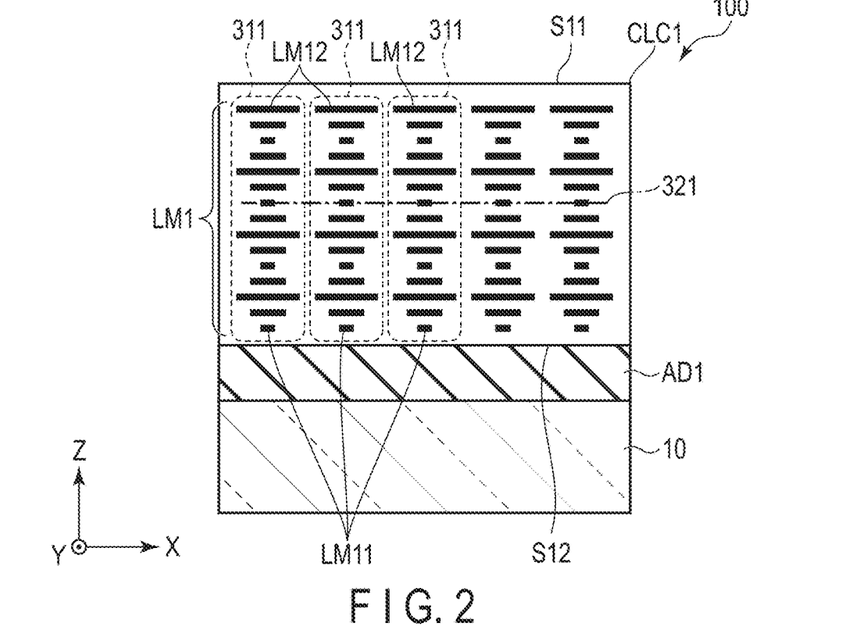
FIG. 2 is a diagram illustrating an example of cholesteric liquid crystals contained in a cholesteric liquid crystal layer.

FIG. 2 is a diagram illustrating an example of the cholesteric liquid crystals 311 contained in the cholesteric liquid crystal layer CLC1.

In FIG. 2, the cholesteric liquid crystal layer CLC1 is enlarged along the third direction Z. Further, for simplification, of a plurality of liquid crystal molecules located in the same plane parallel to the X-Y plane, one liquid crystal molecule LM1 is illustrated as a liquid crystal molecule LM1 which constitute a cholesteric liquid crystal 311. The alignment direction of the illustrated liquid crystal molecule LM1 corresponds to an average alignment direction of the plurality of liquid crystal molecules located in the same plane.

When focusing on one cholesteric liquid crystal 311, it is seen that the cholesteric liquid crystal 311 is constituted by a plurality of liquid crystal molecules LM1 stacked in a spiral manner along the Z direction while rotating. The plurality of liquid crystal molecules LM1 include a liquid crystal molecule LM11 at one end of the cholesteric liquid crystal 311 and a liquid crystal molecule LM12 at the other end of the cholesteric liquid crystal 311. The liquid crystal molecule LM11 is proximate to the main surface S12 or the adhesive layer AD1. The liquid crystal molecule LM12 is in proximity to the main surface S11.

In the cholesteric liquid crystal layer CLC1 of the illustrated example, a plurality of cholesteric liquid crystals 311 adjacent to each other along the first direction X are aligned in one alignment direction. In other words, the alignment directions of the plurality of liquid crystal molecules LM11 adjacent to each other along the first direction X are substantially coincide with each other. Further, the alignment directions of the plurality of liquid crystal molecules LM12 adjacent to each other along the first direction X as well substantially coincide with each other.

The reflective surface 321 of the cholesteric liquid crystal layer CLC1 is formed into a planar-like expanding along the X-Y plane. The reflective surface 321 here corresponds to a plane in which the alignment directions of the liquid crystal molecules LM1 coincide with each other, or a plane in which the spatial phases match each other (an isophase plane).

The cholesteric liquid crystal layer CLC1 having such a structure is cured in the state where the alignment direction of the liquid crystal molecules LM1 is fixed. In other words, the alignment direction of the liquid crystal molecules LM1 is not controlled according to an electric field. For this reason, the liquid crystal element 100 is not equipped with electrodes for forming an electric field in the cholesteric liquid crystal layer CLC1.

Generally, the selective reflection wavelength band Δλ of the cholesteric liquid crystals 311 with respect to vertically incident light is expressed by "Δn*P" where P represents the helical pitch of the cholesteric liquid crystals 311 and Δn represents the refractive index anisotropy (a difference between the refractive index ne for abnormal light and the refractive index no for normal light). The specific wavelength range of the selective reflection wavelength band Δλ is in a range of (no*P to ne*P).

Figure 3:
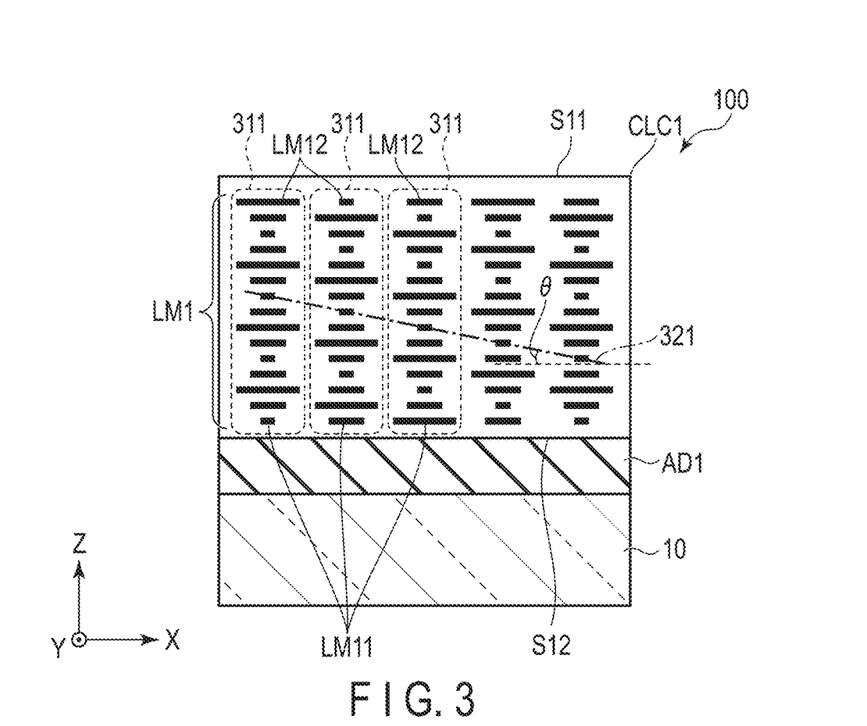
FIG. 3 is a diagram illustrating another example of cholesteric liquid crystals contained in the cholesteric liquid crystal layer.

FIG. 3 is a diagram illustrating another example of the cholesteric liquid crystals 311 contained in the cholesteric liquid crystal layer CLC1.

The example shown in FIG. 3 is different from that of FIG. 2 in that the alignment directions of the plurality of adjacent cholesteric liquid crystals 311 along the first direction X are different from each other. Here, in terms of the alignment direction, the plurality of liquid crystal molecules LM11 are various continuously along the first direction X. Further, in terms of the alignment direction, the plurality of liquid crystal molecules LM12 are various continuously along the first direction X. These alignment directions will be described later.

The reflective surface 321 of the cholesteric liquid crystal layer CLC1 is inclined with respect to the X-Y plane. The angle θ made between the reflection surface 321 and the X-Y plane is an acute angle.

Figure 4:
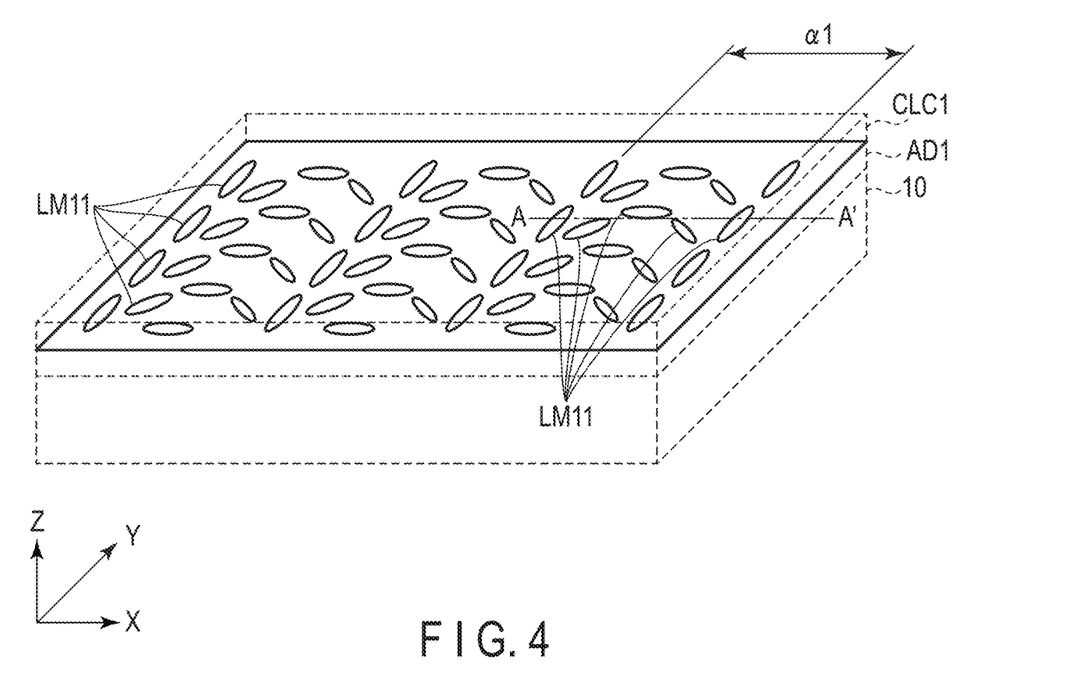
FIG. 4 is a diagram showing an example of an alignment pattern of liquid crystal molecules shown in FIG. 3.

FIG. 4 is a diagram showing an example of the alignment pattern of the liquid crystal molecules LM11 shown in FIG. 3.

In the cholesteric liquid crystal layer CLC1, the alignment directions of the liquid crystal molecules LM11 aligned along the first direction X are different from each other. For example, when focusing on five liquid crystal molecules LM11 aligned along line A-A', the alignment direction among the liquid crystal molecules LM11 varies along the first direction X (from left to right in the figure) by a certain angle in a clockwise direction. Here, the amount of variation in the alignment direction among the liquid crystal molecules LM11 adjacent to each other is constant along the first direction X, but it may gradually increase or gradually decrease.

Here, the distance between two liquid crystal molecules LM11 when the alignment direction among the liquid crystal molecules LM11 varies by 180 degrees along the first direction X is defined as the alignment pitch $\alpha 1$.

On the other hand, in the cholesteric liquid crystal layer CLC1, the alignment directions of the liquid crystal molecules LM11 aligned along the second direction Y substantially coincident with each other. In other words, the spatial phase in the X-Y plane of the cholesteric liquid crystal layer CLC1 varies continuously along the first direction X and is substantially constant in the second direction Y.

Next, a method of manufacturing the liquid crystal element 100 according to the first embodiment will be described with reference to FIGS. 5 and 6.

Figure 5:
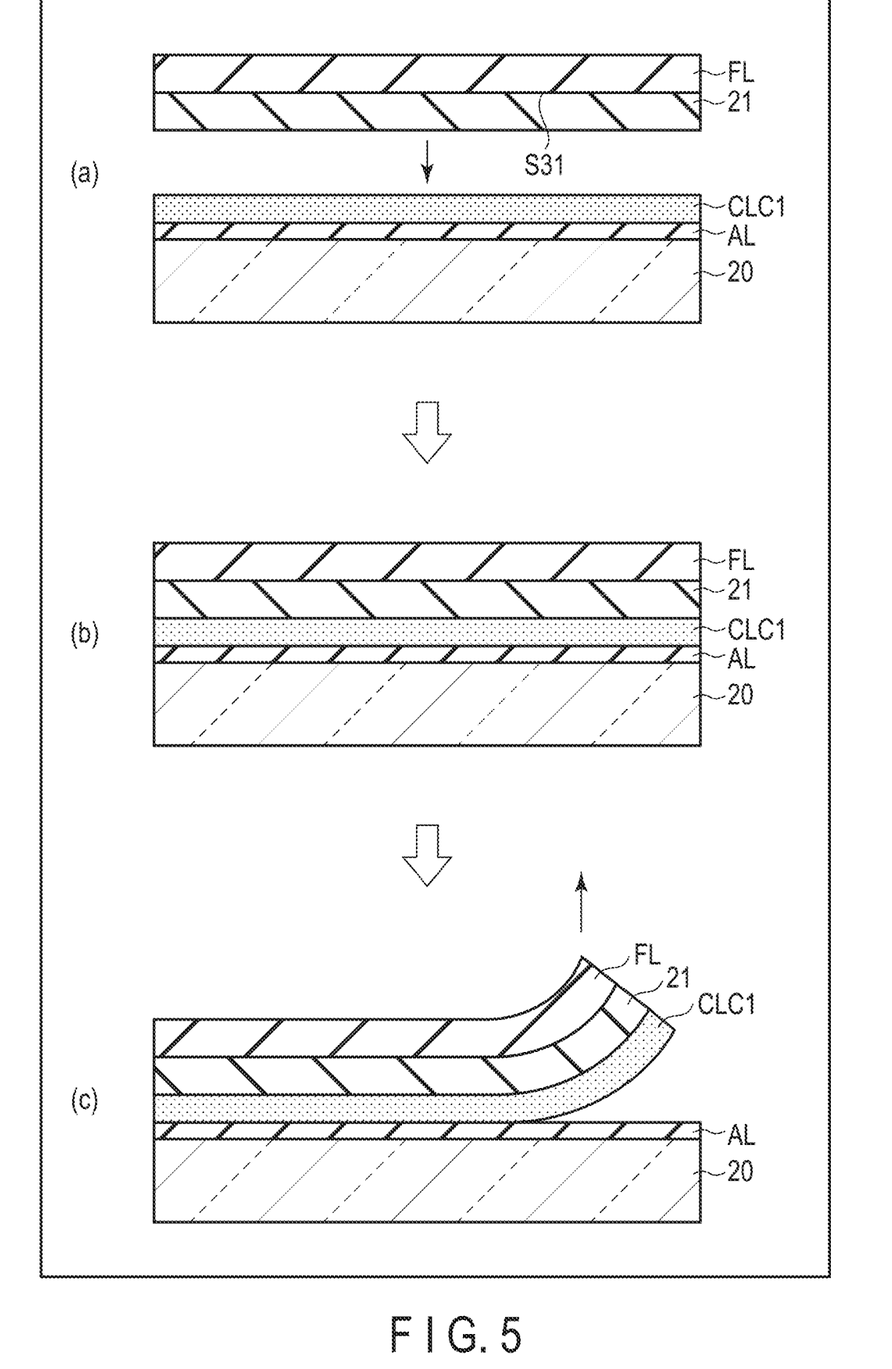
FIG. 5 is a diagram showing a processing step of peeling the cholesteric liquid crystal layer from a support.

FIG. 5 is a diagram showing a process step of peeling the cholesteric liquid crystal layer CLC1 from the support 20.

As shown in FIG. 5, part (a), first, a washed support 20 is prepared. The support 20 is formed by glass, for example, but may be formed by some other material such as resin.

Then, an alignment layer AL is formed on the support 20, and alignment treatment is carried out on the alignment layer AL. Rubbing and photo-alignment treatments are applicable as alignment treatments.

One method of the photo-alignment treatment is to irradiate linearly polarized ultraviolet light onto the alignment layer AL. By applying this method, such an alignment pattern can be formed that the alignment directions of liquid crystal molecules in proximity to the adhesive layer AD1 are aligned in one direction, as described with reference to FIG. 2.

Another method of photo-alignment treatment is to irradiate an interference pattern of rightward circularly polarized ultraviolet light and leftward circularly polarized ultraviolet light onto the thin film. By applying this method, such a complex alignment pattern can be formed that the alignment direction varies continuously among the liquid crystal molecules in proximity to the adhesive layer AD1 as described with reference to FIG. 3.

Subsequently, the cholesteric liquid crystal layer CLC1 is formed on the alignment layer AL.

More specifically, a liquid crystal mixture for forming the cholesteric liquid crystal layer CLC1 is prepared. The liquid crystal mixture is prepared by mixing a liquid crystal monomer, chiral monomer, plasticizer, cross-linking agent and photoinitiator into a solvent. As solvents, organic solvents such as hexane, cyclohexane, cyclohexanone, heptane, toluene, anisole, propylene glycol monomethyl ether acetate (PGMEA) and the like are applicable.

Then, the liquid crystal mixture is applied on top of the alignment layer AL. Here, it is not necessary to overlay other components on of the coating liquid crystal mixture. The liquid crystal molecules in proximity to the alignment layer AL are aligned in a predetermined direction by the alignment restriction force of the alignment layer AL. After that, while the liquid crystal mixture is exhibiting the cholesteric liquid crystal phase, the solvent is removed to temporarily cure the liquid crystal mixture, and ultraviolet light is applied thereto. In this manner, a cholesteric liquid crystal layer CLC1 with elasticity is formed.

Next, a flexible substrate FL to which the adhesive layer 21 is bonded is prepared. The flexible substrate FL is a flexible substrate formed using a polymer such as polyethylene terephthalate (PET). The adhesive layer 21 is adhered to one main surface S31 of the flexible substrate FL. The flexible substrate FL is placed so that the main surface S31 opposes the cholesteric liquid crystal layer CLC1, that is, the adhesive layer 21 opposes the cholesteric liquid crystal layer CLC1.

Next, as shown in FIG. 5, part (b), the flexible substrate FL is adhered to the cholesteric liquid crystal layer CLC1 via the adhesive layer (first adhesive layer) 21. In other words, the adhesive layer 21 is adhered to the cholesteric liquid crystal layer CLC1. In the state shown in FIG. 5, part (b), the support 20, the alignment layer AL, the cholesteric liquid crystal layer CLC1, the adhesive layer 21 and the flexible substrate FL are stacked one on another in this order.

Then, as shown in FIG. 5, part (c), the cholesteric liquid crystal layer CLC1 adhered to the flexible substrate FL is peeled off from the support 20 and the alignment layer AL. Here, the first adhesive force between the adhesive layer 21 and the cholesteric liquid crystal layer CLC1 is greater than the second adhesive force between the alignment layer AL and the cholesteric liquid crystal layer CLC1. Therefore, the cholesteric liquid crystal layer CLC1 can be easily peeled off from the alignment layer AL without applying energy such as light, heat or the like. The adhesive layer 21 is formed of a material such that the first adhesive force becomes greater than the second adhesive force. In the example illustrated, the cholesteric liquid crystal layer CLC1 is gradually peeled off from one end of the support 20 to the other end. During this period, for example, the flexible substrate FL, the adhesive layer 21 and the cholesteric liquid crystal layer CLC1 are curved.

According to this embodiment, the cholesteric liquid crystal layer CLC1 has elasticity because it contains a plasticizer. Therefore, even if the cholesteric liquid crystal layer CLC1 is curved and tensile stress is applied while peeling the cholesteric liquid crystal layer CLC1 from the support 20, the cholesteric liquid crystal layer CLC1 is elongated and can be peeled off without cracks. Therefore, light scattering can be suppressed in a cracked site when a crack is created, and thus light guide loss and degradation of optical properties can be suppressed.

Figure 6:
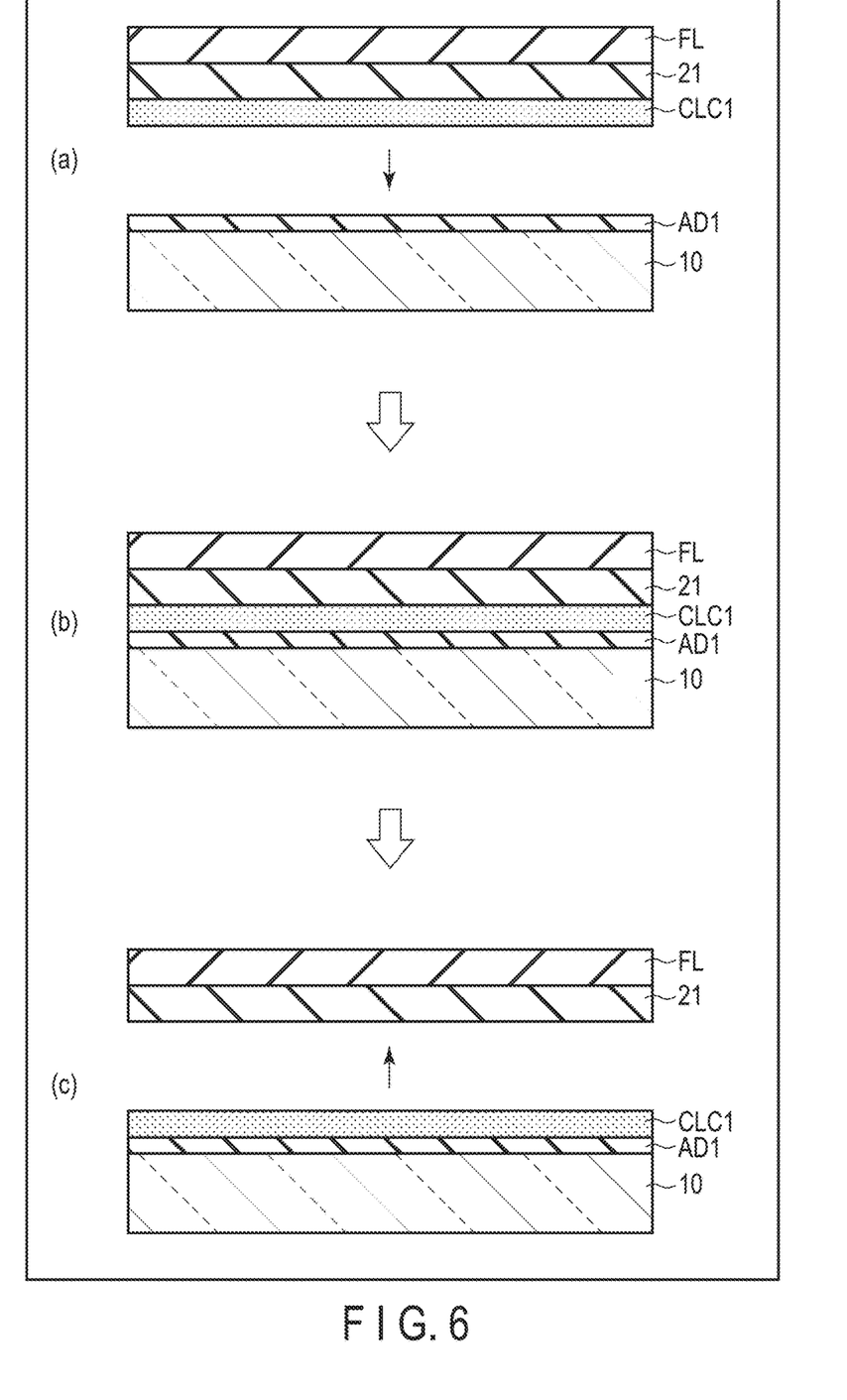
FIG. 6 is a diagram showing a processing step of bonding the cholesteric liquid crystal layer to a substrate.

FIG. 6 is a diagram showing a processing step of adhering the cholesteric liquid crystal layer CLC1 to the substrate 10.

As shown in FIG. 6, part (a), first, a cleaned substrate 10 is prepared. As described above, the substrate 10 is, for example, a glass substrate or a resin substrate. The substrate 10 may be formed using the same material as that of the support 20.

Then, an adhesive layer AD1 is formed on the substrate 10. The material used for the adhesive layer AD1 is different from the material used for the adhesive layer 21, for example.

Then, a flexible substrate FL to which the cholesteric liquid crystal layer CLC1 is adhered by the processing step shown in FIG. 5 is prepared. The flexible substrate FL is disposed so that the cholesteric liquid crystal layer CLC1 opposes the adhesive layer AD1.

Next, as shown in FIG. 6, part (b), the cholesteric liquid crystal layer CLC1 is adhered to the substrate 10 via the adhesive layer (second adhesive layer) AD1. In other words, the cholesteric liquid crystal layer CLC1 is adhered to the adhesive layer AD1. In the state shown in FIG. 6, part (b), the substrate 10, the adhesive layer AD1, the cholesteric liquid crystal layer CLC1, the adhesive layer 21 and the flexible substrate FL are stacked in this order.

Then, as shown in FIG. 6, part (c), the flexible substrate FL and the adhesive layer 21 are removed. In other words, the adhesive strength of the adhesive layer 21 is reduced by heating, light irradiation or the like and the adhesive layer 21 is peeled off at the interface between the cholesteric liquid crystal layer CLC1 and the adhesive layer 21. The adhesive layer 21 is, for example, a tape or an adhesive agent whose adhesive strength is reduced by heat, ultraviolet rays, or other external stimuli that cause change in chemical structure, gases, or the like. Therefore, by heating, light irradiation or the like, the adhesive force between the adhesive layer 21 and the cholesteric liquid crystal layer CLC1 can be made lower than that between the adhesive layer AD1 and the cholesteric liquid crystal layer CLC1.

Through the above-described processing steps, the liquid crystal element 100 described with reference to FIG. 1 is produced.

In the processing step shown in FIG. 6, part (c), even if tensile stress is applied to the cholesteric liquid crystal layer CLC1 while the flexible substrate FL is peeled off from the cholesteric liquid crystal layer CLC1, the cholesteric liquid crystal layer CLC1 is elongated, and therefore it can be peeled off without causing cracks.

Second Embodiment

Figure 7:
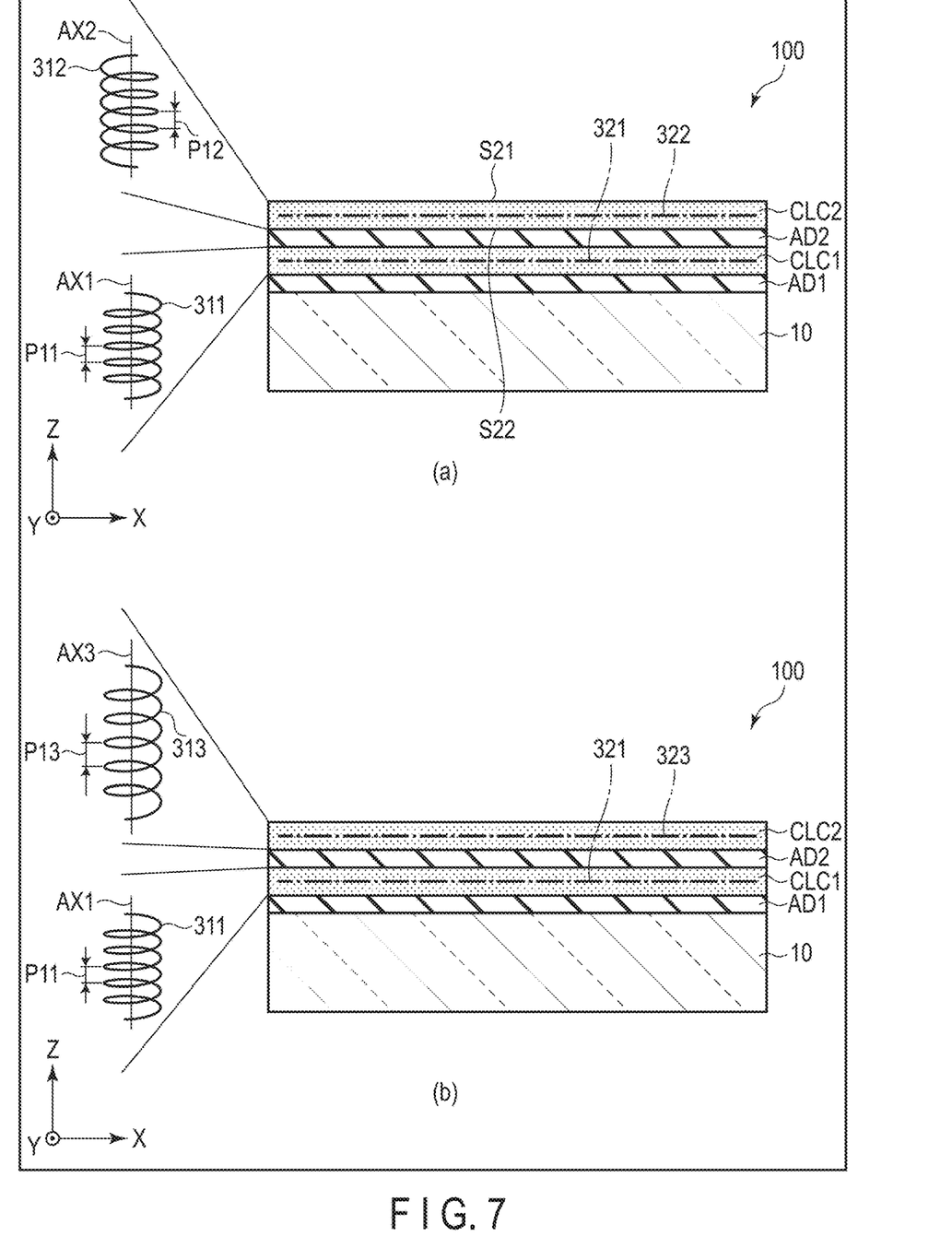
FIG. 7 is a cross-sectional view showing an example of a liquid crystal element according to the second embodiment.

FIG. 7 is a cross-sectional view showing an example of a liquid crystal element 100 according to the second embodiment.

The example shown in FIG. 7 is different from that of FIG. 1 in that the liquid crystal element 100 comprises a cholesteric liquid crystal layer (second cholesteric liquid crystal layer) CLC2 disposed above the cholesteric liquid crystal layer (first cholesteric liquid crystal layer) CLC1. Further, the liquid crystal element 100 comprises an adhesive layer AD2 between the cholesteric liquid crystal layer CLC1 and the cholesteric liquid crystal layer CLC2. The adhesive layers AD1 and AD2 may be different from each other in material, thickness, and optical properties.

The cholesteric liquid crystal layer CLC2 is adhered to the adhesive layer AD2. The cholesteric liquid crystal layer CLC2 is formed from a material similar to that of the cholesteric liquid crystal layer CLC1 and has elasticity because it contains a plasticizer. The cholesteric liquid crystal layer CLC2 includes a main surface (inner surface) S21 and a main surface (outer surface) S22 on an opposite side of the main surface S21. The main surface S22 is in contact with the adhesive layer AD2. The main surface S21 and the main surface S22 are substantially parallel to the X-Y plane.

Note that the main surface S21 is in contact with a low refractive index medium having a refractive index lower than that of the cholesteric liquid crystal layer CLC2. The low refractive index medium is, for example, air, as described above. The main surface S21 can form a light-entering surface of the liquid crystal element 100.

The cholesteric liquid crystal layer CLC2 contains cholesteric liquid crystals 312 rotating in a second rotating direction opposite to the first rotating direction, as shown schematically in an enlarged view. The cholesteric liquid crystal 312 includes a helical axis AX2 substantially parallel to the third direction Z and a helical pitch P12 along the third direction Z. The helical axis AX2 is parallel to the helical axis AX1. The helical pitch P12 is equivalent to the helical pitch P11.

The cholesteric liquid crystal layer CLC2 includes a reflective surface 322.

In the liquid crystal element 100 of such an example, the reflective surface 321 of the cholesteric liquid crystal layer CLC1 reflects the first circularly polarized light corresponding to the first rotating direction of the cholesteric liquid crystal 311 in the selected reflection wavelength band. Further, the reflective surface 322 of the cholesteric liquid crystal layer CLC2 reflects the second circularly polarized light corresponding to the second rotating direction of the cholesteric liquid crystal 312 in the selective reflection wavelength band.

As shown in FIG. 7, part (a), when the helical pitch P11 and the helical pitch P12 are equivalent to each other, the selective reflection wavelength band of the cholesteric liquid crystal 311 is equivalent to that of the cholesteric liquid crystal 312. Therefore, the first circularly polarized light and the second circularly polarized light in the selective reflection wavelength band can be reflected, and the reflectivity of the selective reflection wavelength band can be improved.

The configuration shown in FIG. 7, part (b) is different as compared to the configuration shown in FIG. 7, part (a) in the cholesteric liquid crystals 313 contained in the cholesteric liquid crystal layer CLC2.

The cholesteric liquid crystal layer CLC2 contains cholesteric liquid crystals 313 rotating in the first rotating direction, as shown schematically in the enlarged view. In other words, the cholesteric liquid crystals 313 rotate in the same direction as that of the cholesteric liquid crystals 311. The cholesteric liquid crystals 313 each have a helical axis AX3 substantially parallel to the third direction Z and a helical pitch P13 along the third direction Z. The helical axis AX3 is parallel to the helical axis AX1. The helical pitch P13 is different from the helical pitch P11.

The cholesteric liquid crystal layer CLC2 includes a reflective surface 323.

As shown in FIG. 7, part (b), when the helical pitch P11 and the helical pitch P13 are different from each other, the selective reflection wavelength band of the cholesteric liquid crystals 311 is different from that of the cholesteric liquid crystals 313. Therefore, the selective reflection wavelength band of the liquid crystal element 100 can be broadened.

According to the second embodiment, the cholesteric liquid crystal layer CLC2 is stacked on the substrate 10 by transfer in a manner similar to that of the cholesteric liquid crystal layer CLC1. Since the cholesteric liquid crystal layer CLC2 has elasticity, advantageous effects similar to those of the first embodiment can be obtained.

Further, as shown in FIG. 7, the alignment patterns of the liquid crystal molecules in the cholesteric liquid crystal layer CLC1 and the cholesteric liquid crystal layer CLC2 may be different from each other.

For example, when a liquid crystal mixture that forms the basis of the cholesteric liquid crystal layer CLC2 is formed on the cholesteric liquid crystal layer CLC1, the alignment of the liquid crystal molecules of the cholesteric liquid crystal layer CLC2 may be affected by the alignment of the liquid crystal molecules of the cholesteric liquid crystal layer CLC1. Furthermore, when the liquid crystal mixture that forms the basis of the cholesteric liquid crystal layer CLC2 is applied, the liquid crystal mixture soaks into the cholesteric liquid crystal layer CLC1, causing the cholesteric liquid crystal layer CLC1 to swell, which may result in a shift in the reflection wavelength. Therefore, it may be in some cases difficult to obtain the desired alignment of the liquid crystal molecules. In this embodiment, the cholesteric liquid crystal layer CLC2 is transferred after being cured on the support 20, and therefore the cholesteric liquid crystal layers CLC1 and CLC2 can be prevented from influencing each other.

Third Embodiment

Figure 8:
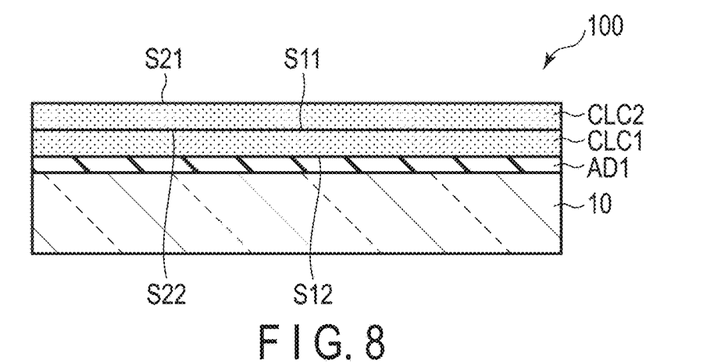
FIG. 8 is a cross-sectional view showing an example of a liquid crystal element according to the third embodiment.

FIG. 8 is a cross-sectional view showing an example of a liquid crystal element 100 according to the third embodiment.

The example shown in FIG. 8 is different as compared to the example shown in FIG. 7 in that no adhesive layer AD2 is formed between the cholesteric liquid crystal layer CLC1 and the cholesteric liquid crystal layer CLC2.

The cholesteric liquid crystal layer CLC1 and the cholesteric liquid crystal layer CLC2 are adhered to each other. In other words, the main surface S11 and the main surface S22 are in contact with each other. With this configuration, the liquid crystal element 100 can be made thinner as compared to the case where the adhesive layer AD2 is formed between the cholesteric liquid crystal layer CLC1 and the cholesteric liquid crystal layer CLC2. In addition, the cost of the material used for the adhesive layer AD2 can be reduced. Further, excellent optical properties can be obtained because light scattering and the like do not occur in the adhesive layer AD2.

Note here that the cholesteric liquid crystals contained in each of the cholesteric liquid crystal layers CLC1 and CLC2 are similar to those of the example shown in FIG. 7, part (a) and (b).

Fourth Embodiment

Figure 9:
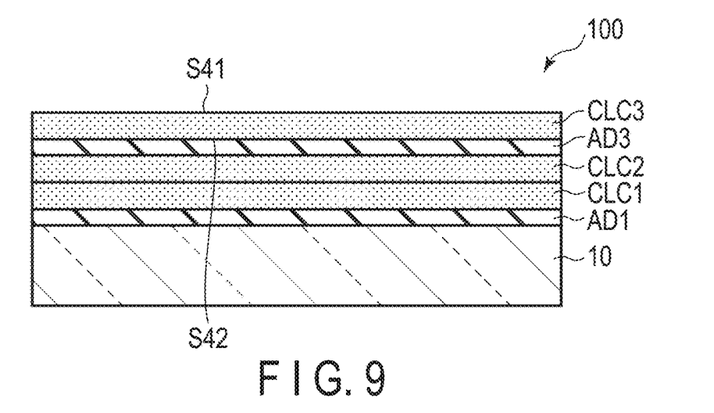
FIG. 9 is a cross-sectional view showing an example of a liquid crystal element according to the fourth embodiment.

FIG. 9 is a cross-sectional view showing an example of a liquid crystal element 100 of the fourth embodiment.

The example shown in FIG. 9 is different as compared to the example shown in FIG. 8 in that the liquid crystal element 100 comprises three cholesteric liquid crystal layers.

The liquid crystal element 100 further comprises a cholesteric liquid crystal layer CLC3 disposed above the cholesteric liquid crystal layer CLC2. The liquid crystal element 100 furthermore comprises an adhesive layer AD3 between the cholesteric liquid crystal layer CLC2 and the cholesteric liquid crystal layer CLC3. The adhesive layers AD1 and AD3 may differ from each other in material, thickness and optical properties.

The cholesteric liquid crystal layer CLC3 is adhered to the adhesive layer AD3. The cholesteric liquid crystal layer CLC3 is formed from a material similar to that of the cholesteric liquid crystal layer CLC1 and has elasticity because it contains a plasticizer. The cholesteric liquid crystal layer CLC3 includes a main surface (inner surface) S41 and a main surface (outer surface) S42 on an opposite side to the main surface S41. The main surface S42 is in contact with the adhesive layer AD3. The main surface S41 and the main surface S42 are substantially parallel to the X-Y plane.

Note that the main surface S41 is in contact with a low refractive index medium having a refractive index lower than that of the cholesteric liquid crystal layer CLC3. The low refractive index medium is, for example, air, as described above. The main surface S41 can form a light-entering surface of the liquid crystal element 100.

The cholesteric liquid crystals contained in the cholesteric liquid crystal layer CLC3 can rotate in either the first or second rotating direction. Further, the helical pitch may be the same as or different from the helical pitches P11 and P12.

Thus, the liquid crystal element 100 may comprise three or more cholesteric liquid crystal layers. According to the fourth embodiment, the cholesteric liquid crystal layer CLC3 is stacked on the substrate 10 by transfer in a manner similar to that of the cholesteric liquid crystal layers CLC1 and CLC2. Since the cholesteric liquid crystal layer CLC3 has elasticity, advantageous effects similar to those of the first embodiment can be obtained.

Fifth Embodiment

Figure 10:
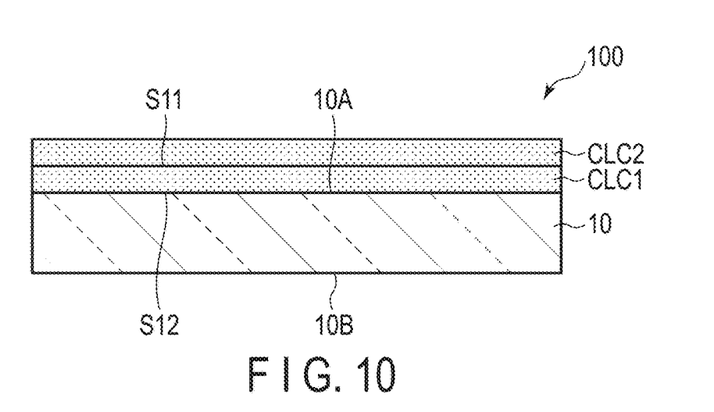
FIG. 10 is a cross-sectional view showing an example of a liquid crystal element according to the fifth embodiment.

FIG. 10 is a cross-sectional view showing an example of a liquid crystal element 100 according to the fifth embodiment.

The example shown in FIG. 10 is different as compared to the example shown in FIG. 8 in that no adhesive layer AD1 is formed between the substrate 10 and the cholesteric liquid crystal layer CLC1.

The substrate 10 and the cholesteric liquid crystal layer CLC1 are in close contact with each other. In other words, the main surface 10A and the main surface S12 are in contact with each other. With this configuration, the liquid crystal element 100 can be made thinner as compared to the case where the adhesive layer AD1 is formed between the substrate 10 and the cholesteric liquid crystal layer CLC1. In addition, the cost of the material used for the adhesive layer AD1 can be reduced. Furthermore, good optical characteristics can be obtained because light scattering and the like do not occur in the adhesive layer AD1.

Note that the liquid crystal element 100 may have a configuration of a combination of the third to fifth embodiments. That is, the case where an adhesive layer is used for adhesion between cholesteric liquid crystal layers, the case where adhesion between cholesteric liquid crystal layers is made without using an adhesive layer, the case where an adhesive layer is used for adhesion between the substrate 10 and the cholesteric liquid crystal layer CLC1, the case where adhesion between the substrate 10 and the cholesteric liquid crystal layer CLC1 is made without using an adhesive layer, and the case where the liquid crystal element 100 comprises three or more cholesteric liquid crystal layers may be mixed.

As explained above, according to this embodiment, it is possible to obtain a liquid crystal element and a method for manufacturing a liquid crystal element that can improve the manufacturing yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a liquid crystal element, comprising:

forming an alignment layer on a support;

forming a cholesteric liquid crystal layer containing a plasticizer and having elasticity on the alignment layer;

adhering a flexible substrate to the cholesteric liquid crystal layer via a first adhesive layer;

peeling the cholesteric liquid crystal layer adhered to the flexible substrate, off from the support and the alignment layer;

adhering the cholesteric liquid crystal layer to a rigid substrate via a second adhesive layer; and removing the flexible substrate and the first adhesive layer.

2. The method of claim 1, wherein
the first adhesive layer is formed of such a material that a first adhesive force between the first adhesive layer and the cholesteric liquid crystal layer is greater than a second adhesive force between the alignment layer and the cholesteric liquid crystal layer.

3. The method of claim 1, comprising:

reducing an adhesive strength of the first adhesive layer by heating or light irradiation before removing the flexible substrate and the first adhesive layer.

4. The method of claim 1, wherein the forming a cholesteric liquid crystal layer includes:

preparing a liquid crystal mixture comprising a liquid crystal monomer, a chiral monomer, the plasticizer, a cross-linking agent, and a photoinitiator;

applying the liquid crystal mixture on the alignment layer; and curing the liquid crystal mixture in a state in which the liquid crystal mixture exhibits a cholesteric liquid crystal phase.

* * * * *